United States Patent [19]
Miller et al.

[11] Patent Number: 5,488,549
[45] Date of Patent: Jan. 30, 1996

[54] DECORATIVE LIGHT-SUPPORTING APPARATUS FOR HOLDING CONNECTED STRINGS OF LIGHTS

[76] Inventors: Donna R. Miller; Kenneth B. Miller, both of 7011 E. Avenida de Santiago, Anaheim Hills, Calif. 92807

[21] Appl. No.: 325,576

[22] Filed: Oct. 19, 1994

[51] Int. Cl.⁶ ............................................. F21P 1/00
[52] U.S. Cl. ..................... 362/252; 362/123; 362/806; 211/195; 428/19; 428/20
[58] Field of Search ................. 428/18, 19, 20; 362/123, 252, 391, 806, 808; 211/195

[56] References Cited

U.S. PATENT DOCUMENTS

| | | | |
|---|---|---|---|
| D. 236,216 | 8/1975 | Fred | D11/118 |
| D. 288,074 | 2/1987 | Vogel | D11/118 |
| D. 323,634 | 2/1992 | Green | D11/118 |
| D. 325,358 | 4/1992 | Johnson | D11/118 |
| D. 325,887 | 5/1992 | Vodhanel, Jr. | D11/118 |
| 1,778,597 | 10/1930 | Herzog | 362/123 X |
| 2,806,938 | 9/1957 | Henry | 40/431 |
| 2,864,192 | 12/1958 | Shoalts | 362/123 |
| 3,674,612 | 7/1972 | Gehl, Jr. | 428/7 |
| 3,704,366 | 11/1972 | Korb et al. | 362/123 |
| 3,735,117 | 5/1973 | Hunt | 362/123 |
| 3,789,526 | 2/1974 | Lavinson | 40/124 |
| 3,819,459 | 6/1974 | Wren | 362/123 |
| 4,620,270 | 10/1986 | Laakso | 362/123 |
| 4,736,282 | 4/1988 | Ahroni | 362/123 |
| 4,746,022 | 5/1988 | Benham | 211/195 |
| 4,979,085 | 12/1990 | Voorhees | 362/252 |
| 5,094,893 | 3/1992 | Snider | 428/18 |
| 5,359,502 | 10/1994 | Cantin | 362/123 |

*Primary Examiner*—Stephen F. Husar
*Attorney, Agent, or Firm*—Price, Gess & Ubell

[57] ABSTRACT

A decorative light-supporting apparatus having three rigid supports is disclosed. The lower ends of the rigid supports hold the decorative light-supporting apparatus above a surface. A lower skirt detachably connects the three rigid supports near their lower ends, and a cap detachably fits over and joins the upper ends of the rigid supports. The cap has a plurality of protrusions extending from an upper surface of the cap to facilitate wrapping of a string of lights over the upper surface and between the protrusions. A bottom edge of the lower skirt has a plurality of skirt protrusions to facilitate wrapping of the string of lights between the cap and the plurality of skirt protrusions. Each wrap routes the string of lights from a skirt protrusion to the upper surface and back down to and around another skirt protrusion.

30 Claims, 2 Drawing Sheets

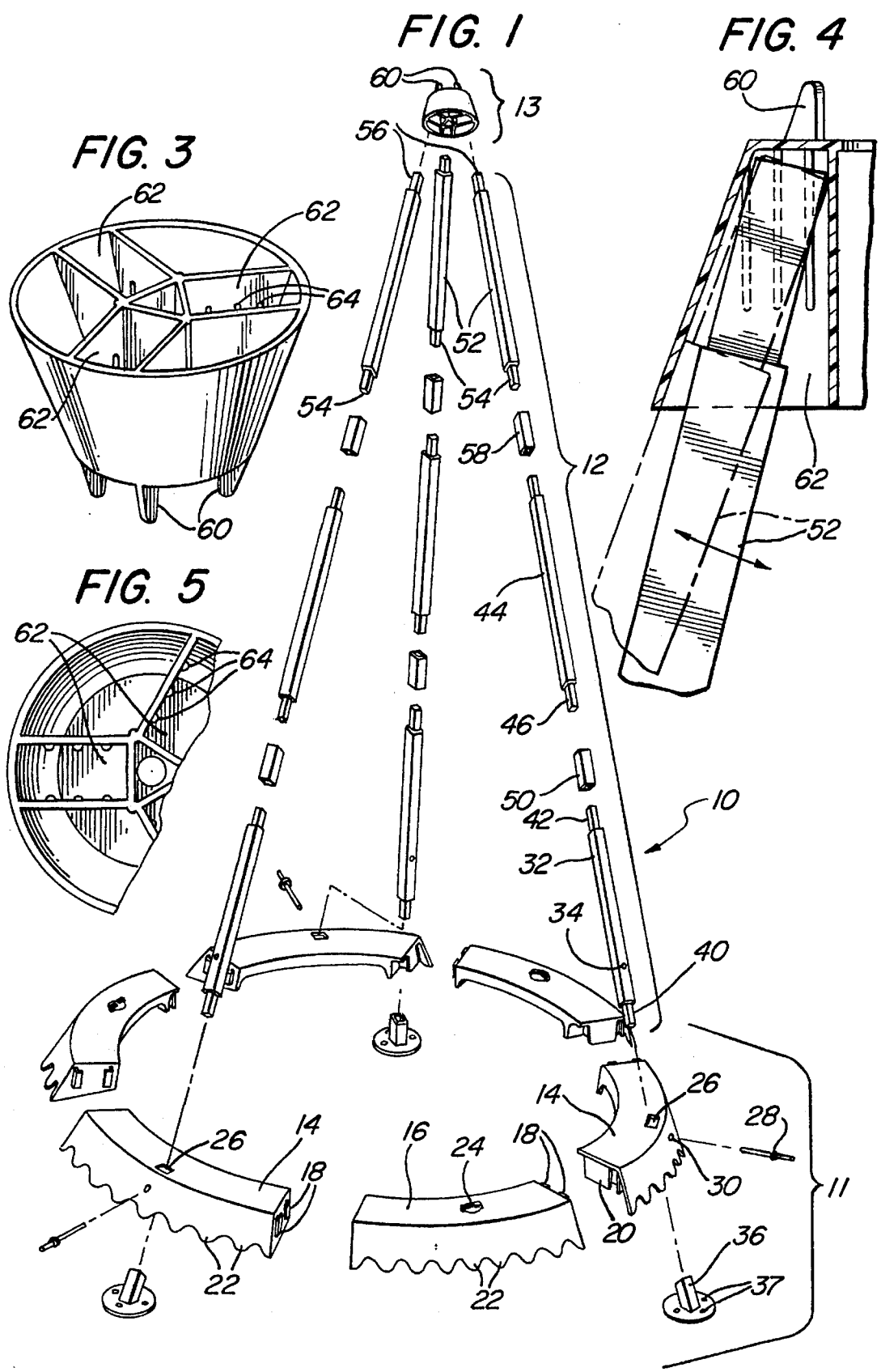

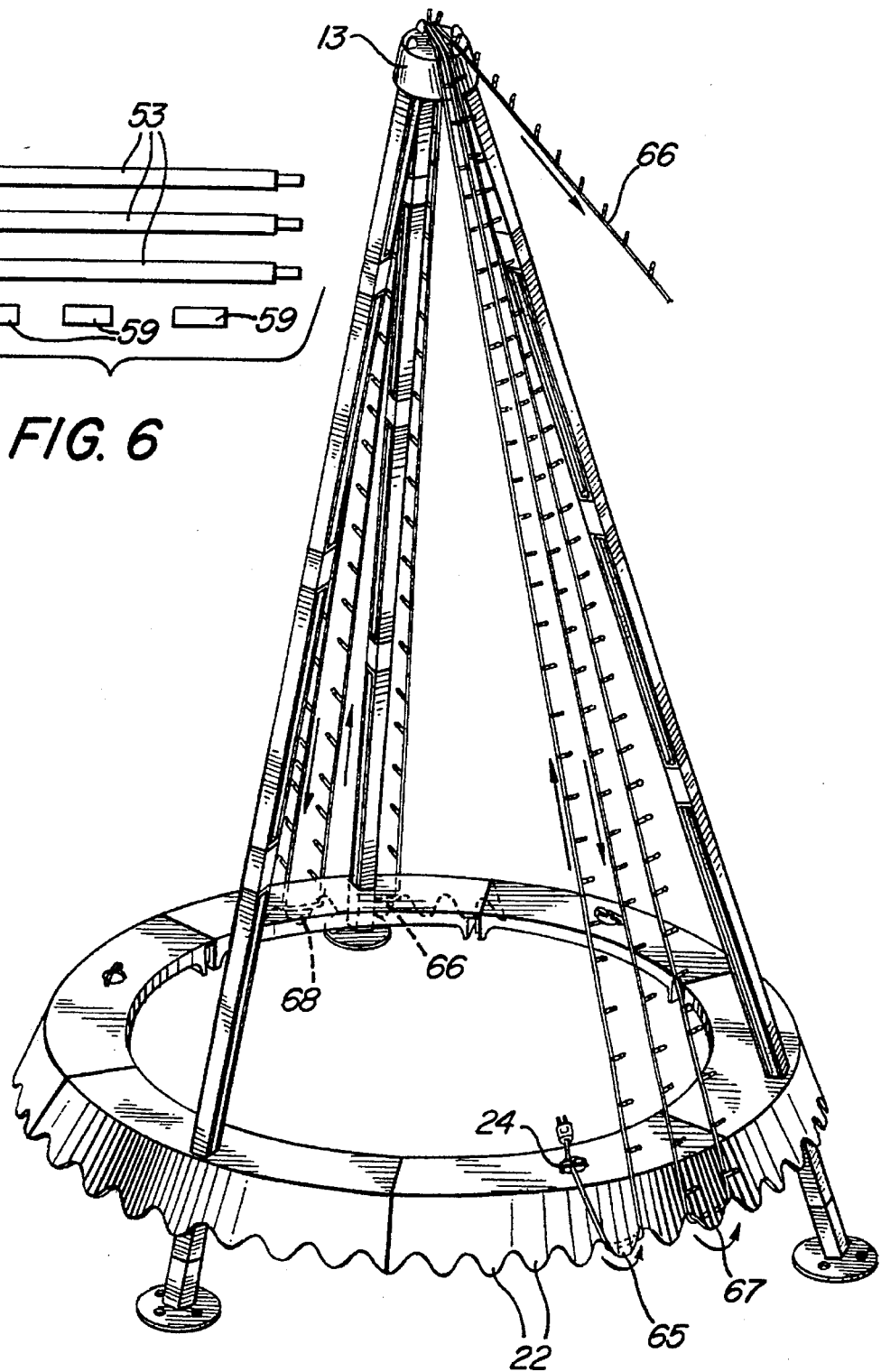

5,488,549

DECORATIVE LIGHT-SUPPORTING APPARATUS FOR HOLDING CONNECTED STRINGS OF LIGHTS

BACKGROUND OF THE INVENTION

1. Field of the Invention

The present invention relates generally to artificial Christmas trees and, in particular, to a decorative light-supporting apparatus for holding connected strings of lights.

2. Description of Related Art

Artificial Christmas trees are often expensive and cumbersome to assemble and store. Many artificial Christmas trees sold with lights preaffixed can be especially expensive. Some trees include metal parts which can be heavy, as well as dangerous in the event of an electrical short.

Artificial Christmas trees often include a trunk and numerous branches that are expensive, complex, and time-consuming to assemble and store. The numerous branches must be sufficiently strong, and are angled upwards to prevent excessive sagging of the branches from the weight of the lights. Additionally, the trunks are often made of several trunk pieces. The number of the trunk pieces may be changed to vary the height of the tree. If the trunk pieces are not firmly fastened together, a user lifting the tree from a top portion of the trunk can sever the trunk. Thus, the lights burden the branches with a downward force and do not hold the tree together when lifted.

The prior art has proposed light-supporting frames, which resemble shapes of a lighted tree at night, but these designs are often complex. For example, U.S. Pat. No. 5,094,893 to Snider discloses a light-supporting frame which draws support from a large number of guy wires. The metal guy wires present an electrical hazard, and add to the assembly time for the tree. Ends of guy wires can puncture fingers, and the wires and stakes are cumbersome to disassemble and store.

SUMMARY OF THE INVENTION

The present invention provides a decorative light-supporting apparatus that is both inexpensive and simple in design. The present invention does not need to be sold with lights preaffixed and further does not need specially manufactured lights. Since the present invention is comprised entirely of plastic parts, the present invention is both light and safe from electrical malfunctions. The simple tripod design of the present invention does not require a trunk and numerous branches attached thereto. Moreover, conventional lights vertically wrapped around the apparatus do not promote sagging of the tree, but rather add support and stability, enabling the apparatus to be lifted from an upper portion of the apparatus.

The present invention provides a decorative light-supporting apparatus having three rigid supports. The lower ends of the rigid supports hold the decorative light-supporting apparatus above a surface. A lower skirt detachably connects the three rigid supports near their lower ends, and a cap detachably fits over and joins the upper ends of the rigid supports. The cap has a plurality of protrusions extending from an upper surface of the cap to facilitate wrapping of a string of lights between or around the protrusions. A bottom edge of the lower skirt has a plurality of skirt protrusions, to facilitate rapid wrapping of the string of lights, up and down, between the cap and successive skirt protrusions on the opposite side.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is an exploded diagram of the decorative light-supporting apparatus of the invention constructed at an intermediate height;

FIG. 2 is a perspective view of the decorative light-supporting apparatus of the presently preferred embodiment having a portion of the string of lights assembled thereupon;

FIG. 3 is a perspective view of the cap of the presently preferred embodiment which fits at the top of the decorative light-supporting apparatus;

FIG. 4 is a cross-section of the cap of the presently preferred embodiment;

FIG. 5 is a bottom plan view of the cap of the presently preferred embodiment; and FIG. 6 is a perspective view of three unused support members, which can be added to increase the height of the preferred decorative light-supporting apparatus.

DETAILED DESCRIPTION OF THE PREFERRED EMBODIMENT

The following description is provided to enable any person skilled in the art to make and use the invention and sets forth the best modes contemplated by the inventor of carrying out her invention. Various modifications, however, will remain readily apparent to those skilled in the art, since the generic principles of the present invention have been defined herein specifically.

Turning to FIG. 1, the decorative light-supporting apparatus 10 of the presently preferred embodiment is shown disassembled. The decorative light-supporting apparatus 10 generally comprises a lower light-routing means 11 for contacting and routing a connected string of lights, an extending means 12 for extending above the lower light-routing means, and an upper light-routing means 13 for also contacting and routing the connected string of lights. As presently embodied, the lower light-routing means 11 comprises a plurality of parts which form a lower skirt having skirt protrusions on a bottom edge. Alternatively, the lower light-routing means may comprise a square, triangular, or any other polygonal shape, and may be supported above or directly on a surface. In the presently preferred embodiment, the lower skirt comprises three primary skirt members 14 and three secondary skirt members 16. Each of the six skirt members has two folded tabs 18 on a first end and a tongue 20 on a second end. Each of the six skirt members interconnects with adjacent skirt members by inserting a tongue 20 between two folding tabs 18. Alternatively, the skirt members may be connected using conventional fastening means, such as pins, tabs, screws, etc.

The three primary skirt members 14 and the three secondary skirt members 16, along with the other parts shown in FIG. 1, are formed of plastic in the presently preferred embodiment. Each of the skirt members has a side wall and a bottom edge with skirt protrusions 22 thereon. Alternatively, the skirt protrusions may comprise integrally-formed hooks, tabs, notches, etc., and may be located on the upper, lower, inner, or outer edges or surfaces of the skirt members.

Each of the three secondary skirt members 16 has a cord holder 24 formed on an upper surface thereof. The cord holder holds a portion of the string of lights securely to the upper surface of the skirt member 16 to keep extension/power cords connecting strings of lights out of puddles and off of grass.

Each of the primary skirt members 14 includes a rigid-support aperture 26 on an upper surface thereof. Each rigid-support aperture 26 accommodates a corresponding bottom rigid support member 32. First male protrusions 40 of each of the bottom rigid support members 32 fit through the rigid-support apertures 26 into feet 36. The feet 36 support the decorative light-supporting apparatus 10 above a surface. Each foot 36 has three foot apertures 37 for accommodating screws, bolts, nails, stakes, or other fastening means to firmly secure each foot onto a surface.

Pins 28 fit into pin apertures 30 in each of the primary skirt members 14, and further fit into pin apertures 34 in the bottom rigid support members 32. The pins 28 firmly secure the bottom rigid support members 32 to the primary skirt members 14. Other fastening means, such as locking tabs on the bottom rigid support members 32, may also be used.

Connected to and supported above the lower light-routing means 11 of the decorative light-supporting apparatus 10 is an extending means 12. As presently embodied, the extending means 12 comprises three rigid supports. Alternatively, the extending means 12 may comprise two, four, or more supports that are straight or curved, and are rigid or flexible.

Each of the rigid supports can be assembled using up to four support members, as presently embodied, depending on a desired height. FIGS. 1 and 2 show an intermediate-height configuration where a user has decided to use only three of the available four support members for each rigid support. In these figures, the rigid supports comprise the above-mentioned bottom rigid support members 32, middle rigid support members 44, and top rigid support members 52. The three unused rigid support members 53 and connectors 59 are shown in FIG. 6. Alternatively, each support may comprise one or any plurality of support members.

The bottom rigid support member 32 includes both a first male protrusion 40 and a second male protrusion 42. Similarly, each middle rigid support member 44 includes a first male protrusion 46 and a second male protrusion 48, and each top rigid support member 52 includes a first male protrusion 54 and a second male protrusion 56.

The bottom rigid support members 32 are connected to the middle rigid support members 44 with bottom rigid arm connectors 50. Each bottom rigid arm connector 50 fits over the second male protrusion 42 of a bottom rigid support member 32 and over the first male protrusion 46 of a middle rigid support member 44. Similarly, each upper rigid arm connector 58 connects a middle rigid support member 44 with a top rigid support member 52.

The upper light-routing means of the decorative light-supporting apparatus 10 preferably comprises a cap 13 with four protrusions 60 located thereon for supporting and guiding the string of lights over the cap 13. Alternatively, the upper light-routing means may comprise a rectangular, triangular, or any other polygonal shape or other shape that can hold the three male protrusions 56 or the support members 52 together. Similarly, the four protrusions 60 of the upper light-routing means may be of any number and shape, such as a plurality of hooks around the perimeter of a cap, for example. There may be more or less than four protrusions. For example, the four protrusions may be replaced by a single protrusion, wherein the string of lights is wrapped around this single protrusion and back down. Further, the upper light-routing means may comprise a fastening element, such as a string, for securing the top rigid support members 52 together at locations below the male protrusions 56, so that portions of the rigid support members 52 extend above the fastening element, for example.

In an intermediate-height configuration of the presently preferred embodiment, the cap 13 detachably accommodates the second male protrusions 56 of the top rigid support members 52. As shown in FIGS. 3 and 5, the second male protrusions 56 of the top rigid-support members 52 fit into the three rigid-support receiving apertures 62. Each of the rigid support receiving apertures 62 includes reinforcing ribs 64 for extra strength and tightness of fit with angle flexibility to hold various top heights. Of course, in the maximum-height configuration of the presently preferred embodiment, which uses all four rigid support members for each rigid support, the cap 13 accommodates male protrusions of the support members 53 of FIG. 6.

FIG. 4 shows a cross-sectional view of the cap 13 with a top rigid support member 52 inserted into one of the rigid-support receiving apertures 62. The phantom drawing of the top rigid support 52 shows how this top rigid support member 52 fits into a rigid-support receiving aperture 62 when the decorative light-supporting apparatus 10 is formed at a shorter height. For example, this phantom drawing may correspond to a configuration where the rigid supports comprise only the bottom rigid support members 32 and the top rigid support members 52.

Turning to FIG. 2, the decorative light-supporting apparatus 10 of the presently preferred embodiment is shown assembled at an intermediate height and partially covered with a string of lights 66. The string of lights 66 is woven between the skirt protrusions 22 and the cap 13. For example, a user first places the cord of the string of lights into the cord holder 24 and then wraps the string of lights around the skirt protrusion 65 located nearest and to the right of the cord holder 24. In the preferred embodiment, the string of lights is then folded over the top of the cap 13 and back down and around a skirt protrusion 66 located 180 degrees opposite the cord holder 24. The string of lights is moved from the skirt protrusion 66 up to and back over the cap 13, and back down and around a skirt protrusion 67 located to the right of and second from the cord holder 24. The string of lights is then wrapped back over the cap 13 and around a skirt protrusion 68, and back up and over the cap 13 again. This process is continued until each of the skirt protrusions 22 of the decorative light-supporting apparatus 10 has a portion of the string of lights wrapped therearound. In other words, the string of lights is wrapped around the skirt protrusions 22 and the cap 13 until the entire decorative light-supporting apparatus 10 is covered with the string of lights 66. Skirt protrusions may be skipped or doubled up, according to preference. The string of lights may, of course, be wrapped around a protrusion 60 of the cap 13 and returned to an immediately adjacent skirt protrusion.

In the presently preferred embodiment, the primary skirt members 14 all have the same shape, and the secondary skirt members 16 all have the same shape. Similarly, the rigid support members 32, 44, 52, 53, all have the same shape. These sets of identically manufactured parts reduce manufacturing costs and provide for compact storage. The decorative light supporting apparatus of the presently preferred embodiment can be stored in a 30×10×25-inch box by nestling the primary 14 and secondary 16 skirt members and by placing the rigid support members 32, 44, 52, 53 side by side.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A decorative light-supporting apparatus, comprising:

lower light-routing means having protrusions that extend at least partially downwardly therefrom for contacting and routing a connected string of lights behind said protrusions at a first plurality of locations on the connected string of lights;

extending means for extending above the lower light-routing means; and upper light-routing means connected to the extending means for contacting and routing the connected string of lights at a second plurality of locations on the connected string of lights, the connected string of lights contacting and folding over a portion of the upper light-routing means at each of the second plurality of locations;

whereby the connected string of lights is wound a plurality of times between the upper light-routing means and behind the protrusions to form an approximate shape of a Christmas tree, each winding routing the string of lights from behind a protrusion up to the upper light-routing means and back down to and behind another protrusion.

2. A decorative light supporting apparatus, comprising:

a lower skirt having a perimeter with a plurality of skirt protrusions;

a plurality of rigid supports detachably connected to and extending from spaced positions on the lower skirt to converge at an upper area above the lower skirt; and an upper cap detachably receiving the plurality of rigid supports at the upper area, the upper cap having a plurality of cap protrusions, whereby a string of lights may be rapidly draped up and down between the cap protrusions and the skirt protrusions, around the lower skirt, to form a decorative cone of lights resembling a tree.

3. The decorative lighting support apparatus according to claim 2, wherein the lower skirt is annular.

4. The decorative lighting support apparatus according to claim 2, wherein the plurality of skirt protrusions are evenly spaced about the perimeter of the lower skirt.

5. The decorative lighting support apparatus according to claim 2, wherein the lower skirt has a side wall with a bottom edge and the plurality of skirt protrusions are formed from a series of spaced notches on the bottom edge of the side wall.

6. The decorative light-supporting apparatus according to claim 5, wherein the lower skirt comprises a plurality of primary members and a plurality of secondary members, the primary members and secondary members fitting together to form the lower skirt.

7. The decorative light-supporting apparatus according to claim 6, wherein each of the primary and secondary members has two folded tabs on a first end, and a tongue on a second end.

8. The decorative light-supporting apparatus according to claim 7, wherein the first ends join with the second ends by fitting the tongues into slots formed by the two folded tabs of the first ends.

9. The decorative light-supporting apparatus according to claim 2, wherein the plurality of rigid supports comprises three rigid supports.

10. The decorative light-supporting apparatus according to claim 9, wherein each of the primary members has an aperture for accommodating one of the three rigid supports.

11. The decorative light-supporting apparatus according to claim 10, wherein each rigid support is secured into a corresponding one of the apertures by a pin, which fits through a portion of a primary member and into the respective rigid support.

12. The decorative light-supporting apparatus according to claim 2, wherein each of the plurality of rigid supports comprises a plurality of interconnectable support members.

13. The decorative light-supporting apparatus according to claim 12, wherein the decorative light-supporting apparatus can be assembled at different heights by changing lengths of the plurality of rigid supports, each length being changed by changing a number of interconnectable support members used to form each rigid support.

14. The decorative light-supporting apparatus according to claim 13, wherein the plurality of support members converges at any of a plurality of upper areas, depending on the height of the decorative light-supporting apparatus.

15. The decorative light-supporting apparatus according to claim 14, wherein the upper cap accommodates the plurality of rigid supports at each of the different heights of the decorative light-supporting apparatus.

16. A decorative light supporting apparatus, comprising:

a lower skirt having a perimeter with a plurality of skirt protrusions;

a plurality of rigid supports converging at an upper area located centrally above the lower skirt; and a plurality of upper protrusions supported at the upper area by the plurality of rigid supports, whereby a string of lights may be rapidly draped up and down between the upper protrusions and the skirt protrusions, around the lower skirt, to form a decorative cone of lights resembling a tree.

17. The decorative light supporting apparatus according to claim 16, further comprising:

an upper cap having a bottom with a plurality of apertures for receiving corresponding ones of the plurality of rigid supports, the plurality of upper protrusions being formed on an outside of the upper cap.

18. A decorative lighting support apparatus, comprising:

a lower skirt having a perimeter with a plurality of skirt protrusions that extend at least partially downwardly therefrom;

an upper cap having at least one cap protrusion; and means for supporting the upper cap above the lower skirt, whereby a string of lights may be rapidly draped up and down between the cap protrusions and securely behind the skirt protrusions, around the lower skirt, to form a decorative cone of lights resembling a tree.

19. The decorative lighting support apparatus according to claim 18, wherein the lower skirt has a side wall with a bottom edge and the skirt protrusions are formed from a series of spaced notches on the bottom edge of the side wall.

20. The decorative lighting support apparatus according to claim 19, wherein the spaced notches are evenly spaced.

21. The decorative lighting support apparatus according to claim 19, wherein the lower skirt is circular.

22. The decorative lighting support apparatus according to claim 18, wherein the lower skirt is comprised of a plurality of detachably interconnected skirt members.

23. The decorative lighting support apparatus according to claim 18, wherein the lower skirt is circular and the plurality of detachably interconnected skirt members are arcuate.

24. The decorative lighting support apparatus according to claim 18, wherein the supporting means comprises a plurality of rigid supports extending upward from the lower skirt and converging into the upper cap.

25. The decorative lighting support apparatus according to claim 24, wherein the upper cap has a bottom with a plurality of apertures for receiving corresponding ones of the plurality of rigid supports.

26. The decorative lighting support apparatus according to claim 25 further comprising:

a plurality of feet extending below the lower skirt to support the lower skirt above a surface.

27. A decorative light supporting apparatus, comprising:

a lower skirt having a perimeter with a plurality of skirt protrusions, the lower skirt comprising a plurality of skirt members having similar exterior and interior shapes to allow for nestling of the skirt members for compact storage of the skirt members when the lower skirt is disassembled;

a plurality of rigid supports detachably connected to and extending from spaced positions on the lower skirt to converge at an upper area above the lower skirt, each rigid support comprising a plurality of rigid support members having similar lengths and shaped to allow for compact storage of the rigid support members; and an upper cap detachably receiving the plurality of rigid supports at the upper area, the upper cap having a plurality of cap protrusions, whereby a string of lights may be rapidly draped up and down between the cap protrusions and the skirt protrusions, around the lower skirt, to form a decorative cone of lights resembling a tree.

28. The decorative light-supporting apparatus of claim 27, wherein the skirt members have the same exterior and interior shapes.

29. The decorative light-supporting apparatus of claim 27, wherein the rigid support members have the same shapes to allow the rigid support members to be placed side by side during storage.

30. The decorative light-supporting apparatus of claim 27, wherein the decorative light-supporting apparatus, when disassembled, can be stored in a 30×10×25-inch box.

* * * * *